Nov. 10, 1959  H. E. CARNAGUA  2,911,848
AUTOMATIC TRANSMISSION AND CONTROL SYSTEM THEREFOR
Filed July 19, 1941  11 Sheets-Sheet 1

INVENTOR.
Harold E. Carnagua
BY Edward C. Fitzhaugh
Atty

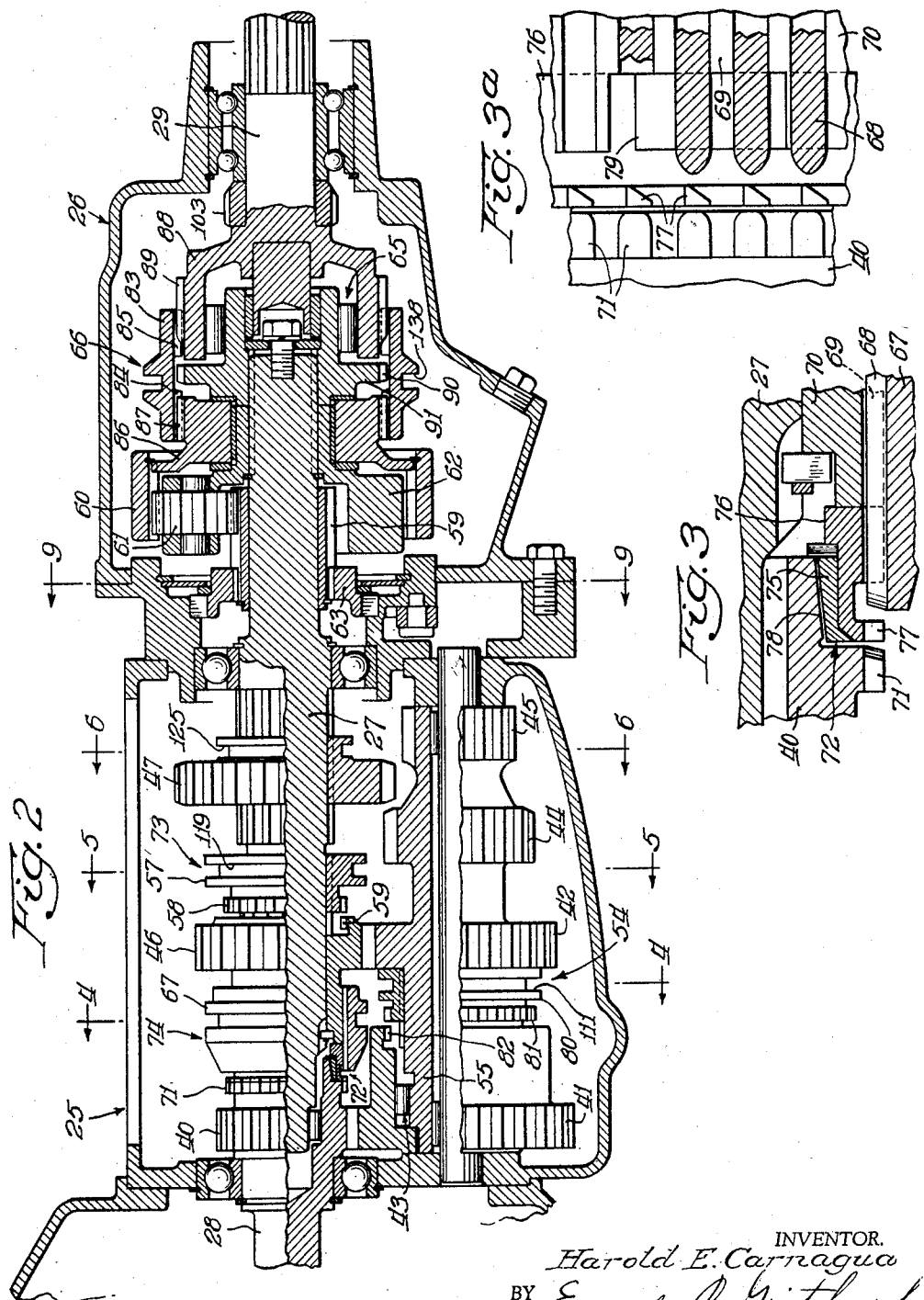

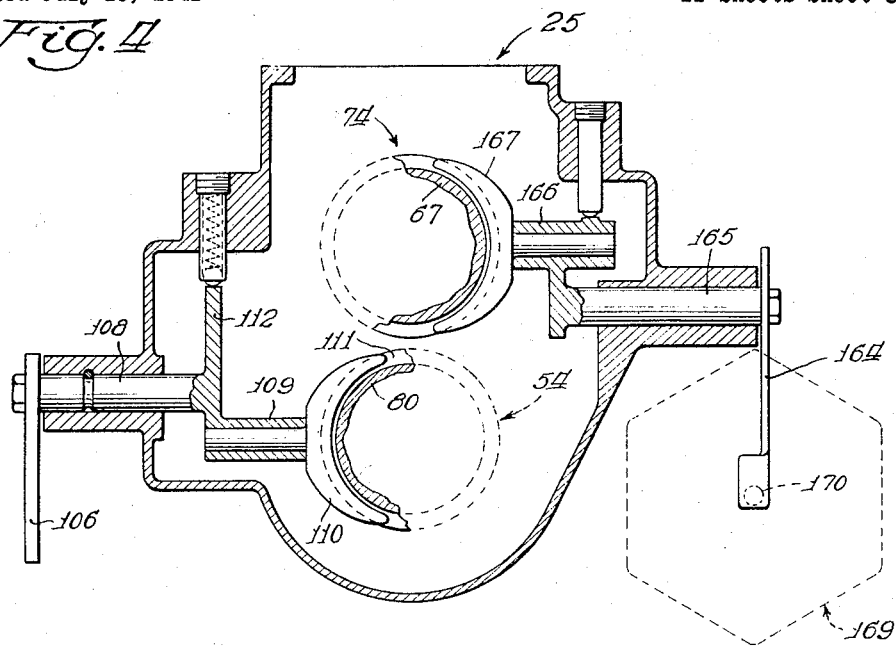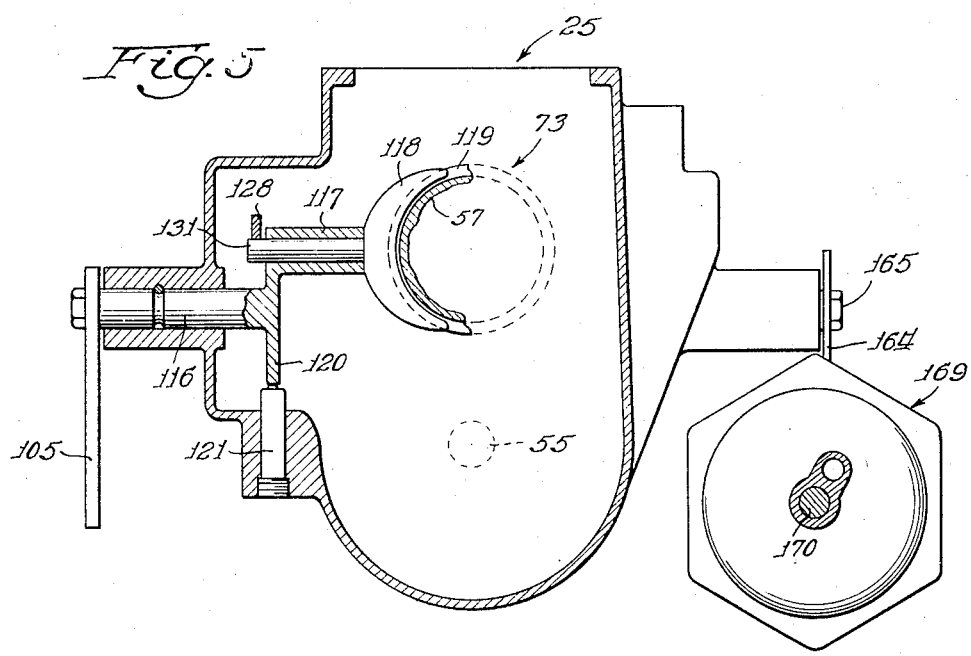

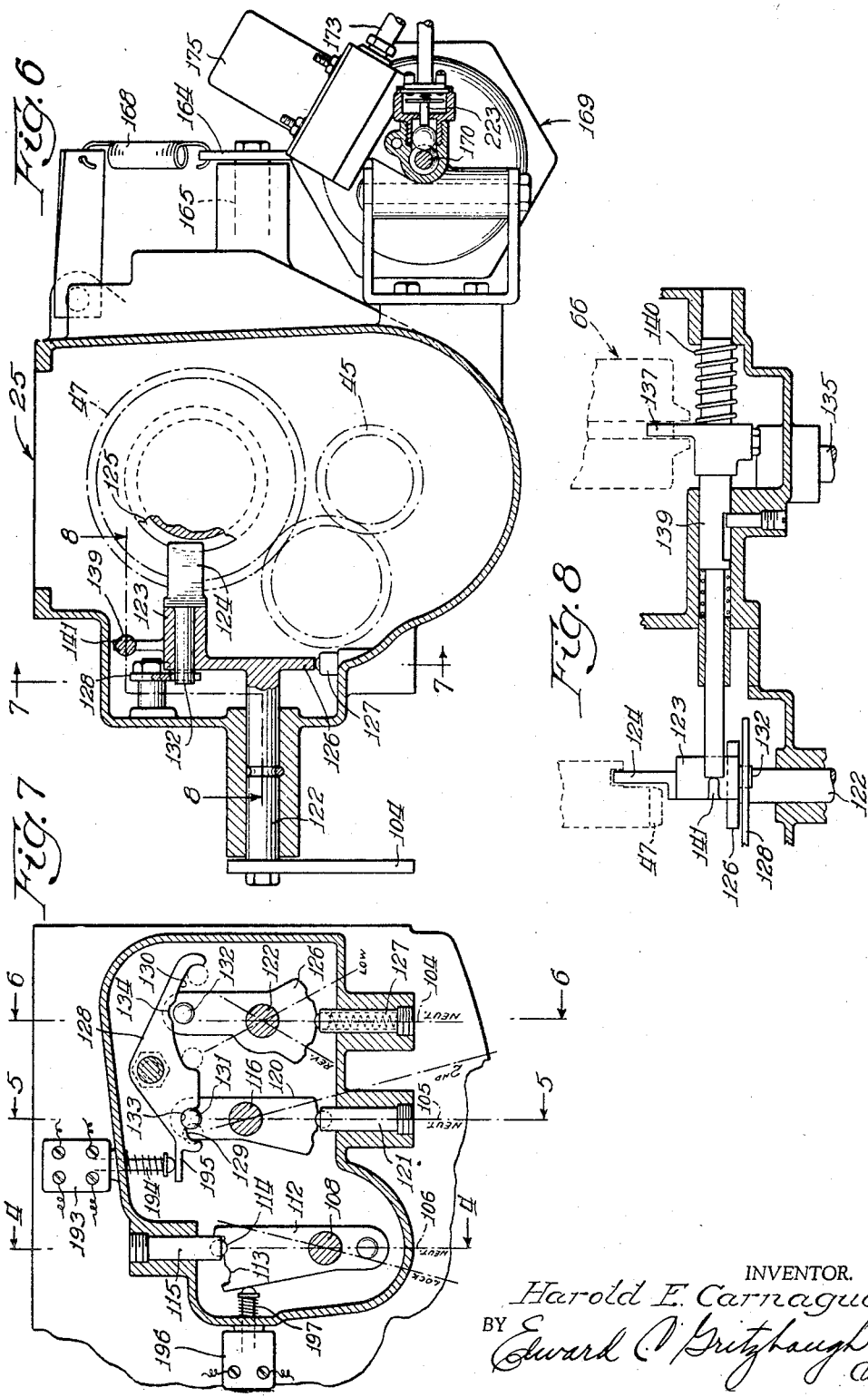

Nov. 10, 1959     H. E. CARNAGUA     2,911,848
AUTOMATIC TRANSMISSION AND CONTROL SYSTEM THEREFOR
Filed July 19, 1941     11 Sheets-Sheet 5

INVENTOR.
Harold E. Carnagua
BY Edward C. Gritzbaugh
Atty.

INVENTOR.
Harold E. Carnagua
BY Edward C. Gritzbaugh
Atty.

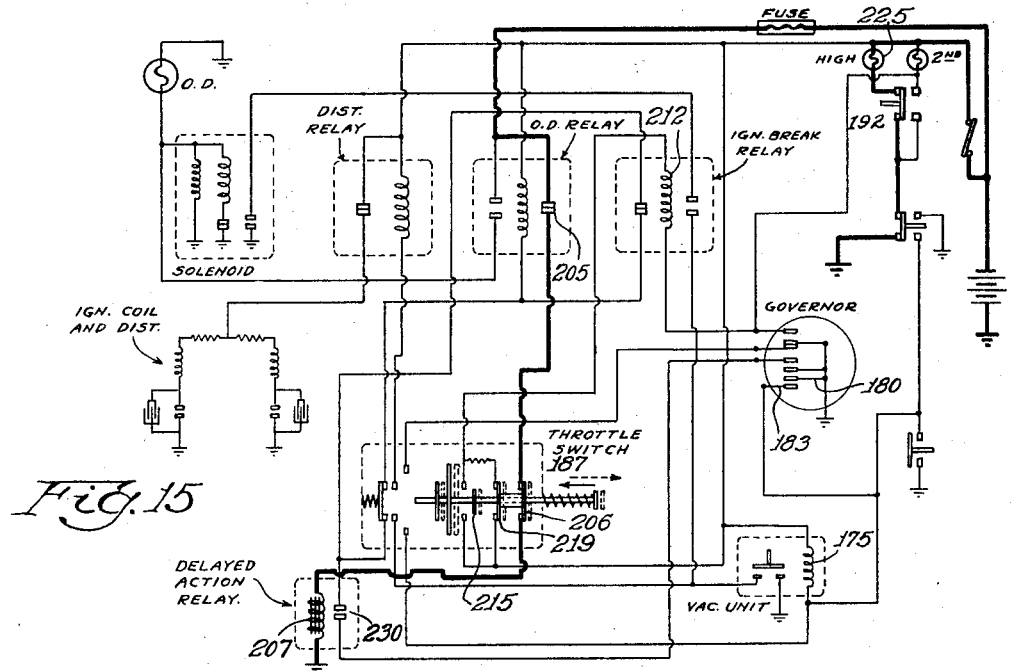
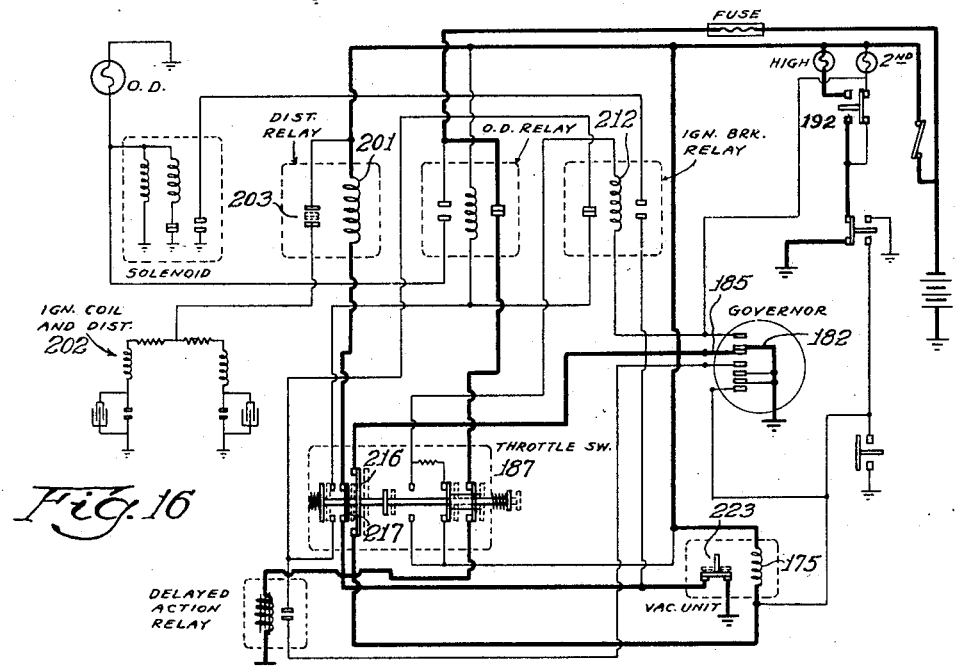

INVENTOR.
Harold E. Carnagua

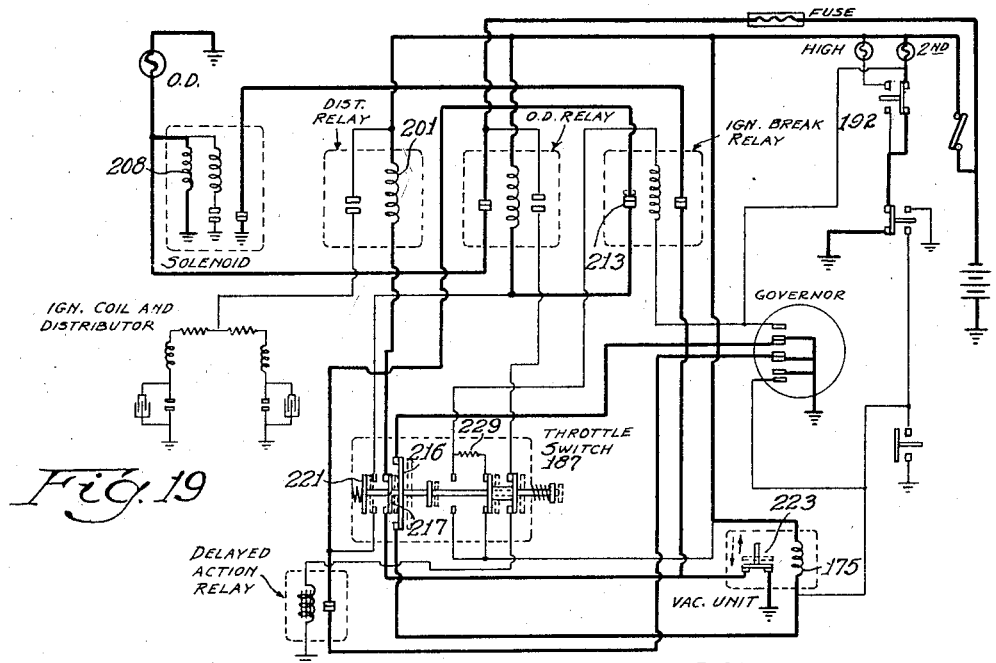
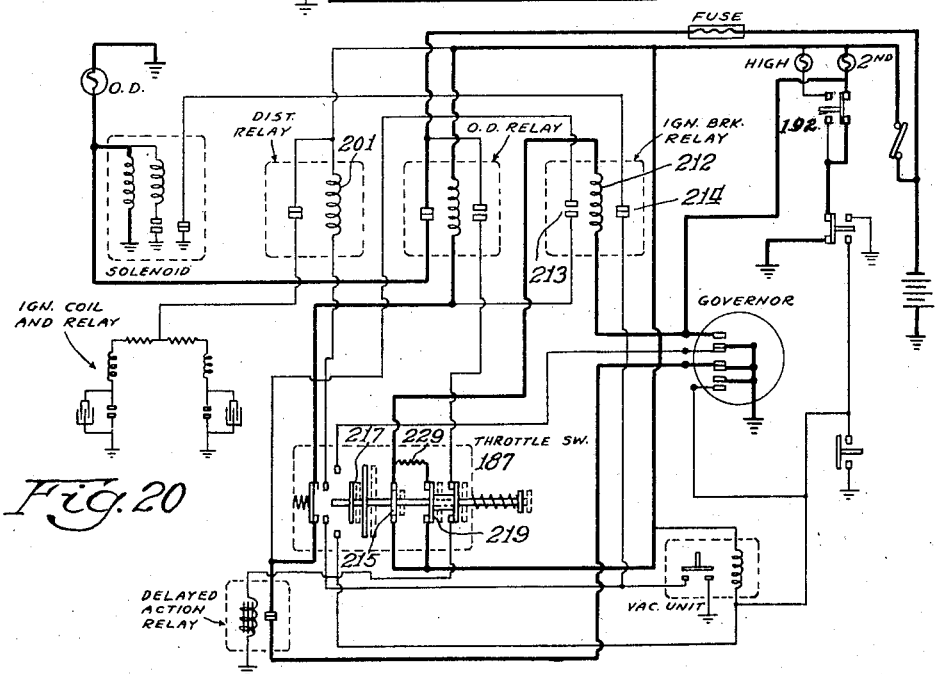

Nov. 10, 1959   H. E. CARNAGUA   2,911,848
AUTOMATIC TRANSMISSION AND CONTROL SYSTEM THEREFOR
Filed July 19, 1941   11 Sheets-Sheet 11

INVENTOR.
Harold E. Carnagua
BY
Edward C. Gritzbaugh
Atty.

United States Patent Office 2,911,848
Patented Nov. 10, 1959

2,911,848
AUTOMATIC TRANSMISSION AND CONTROL SYSTEM THEREFOR

Harold E. Carnagua, Muncie, Ind., assignor to Borg-Warner Corporation, Chicago, Ill., a corporation of Illinois Application July 19, 1941, Serial No. 403,197

25 Claims. (Cl. 74—472)

This invention relates to automatic transmissions for automotive vehicles and particularly to automatic transmissions which are comprised of a plurality of units connected in tandem.

An object of this invention is to provide a plurality of automatically operable units connected together, the automatic operation of the units being integrated in a manner to secure the effect of a single improved automatic transmission.

Another object of this invention is to provide a manual control system for a pair of transmission units operating in tandem, the manual controls coordinating the functions of the individual manual controls on the units.

Another object of this invention is to provide a transmission unit having positively interengageable elements which are automatically conditioned for immediate operation without waiting for a torque reversal to take place, and manually controlled means for effecting a delay in the actual engagement of the elements to permit them to approach synchronism before engaging.

Another object of this invention is a control system for an automatically operated two-unit transmission which permits the operator automatically to effect two successive down shifts under his control and within a predetermined speed range.

Another object of this invention is to provide an electrical control system for a two-unit transmission which includes a throttle-controlled switch and which will permit the operator to effect two successive down shifts in the transmission by successive manipulations of the throttle switch from a down shifting position to a one-half throttle position and then back to the down shifting position.

These and other objects and features of the invention will become apparent from the following detailed description when taken together with the accompanying drawing in which:

Fig. 2 is an elevation in section in detail of the two units employed in the transmission;

Fig. 3 is an enlarged fragmentary elevation in section taken through a jaw clutch and a blocker used in one of the units of the transmission;

Fig. 3a is a development of the blocker of Fig. 3;

Fig. 4 is a section through the first unit of the transmission taken along lines 4—4 of Fig. 2;

Fig. 5 is a section through the first unit of the transmission along lines 5—5 of Fig. 2;

Fig. 6 is a section through the first unit of the transmission taken along lines 6—6 of Fig. 2;

Fig. 7 is a section taken along 7—7 of Fig. 6 showing the interlock mechanism for the first unit of the transmission;

Fig. 8 is a section taken along 8—8 of Fig. 6 showing the lock-up means for the second unit as controlled by a reverse shift of the first unit;

Figs. 13 to 22 are wiring diagrams showing the connections between the various control elements of the transmissions in the several stages of operation of the transmission.

For purposes of illustration this invention will be described with reference to a countershaft type variable speed transmission combined with a planetary type of overdrive transmission, the overdrive transmission being similar to the one disclosed in my copending application Serial No. 309,718, filed December 18, 1939. Certain modifications hereinafter to be described have been made in the overdrive transmission to adapt it for operation with the countershaft unit. It is to be understood however, that the greater portion of the features of this invention may be applied equally as well to two countershaft types of units or to two planetary types of units, or to two hydraulic torque converting units having lock-up mechanism such as that shown in a copending application of J. M. Simpson, Serial No. 357,220, filed September 18, 1940, now Patent No. 2,286,585, dated June 16, 1942. Such features may also be applied where either or both units are underdrives and where both units are in the same casing or in different casings, the different casings being joined together or located at different places in the line of drive.

*General description*

Figure 1:
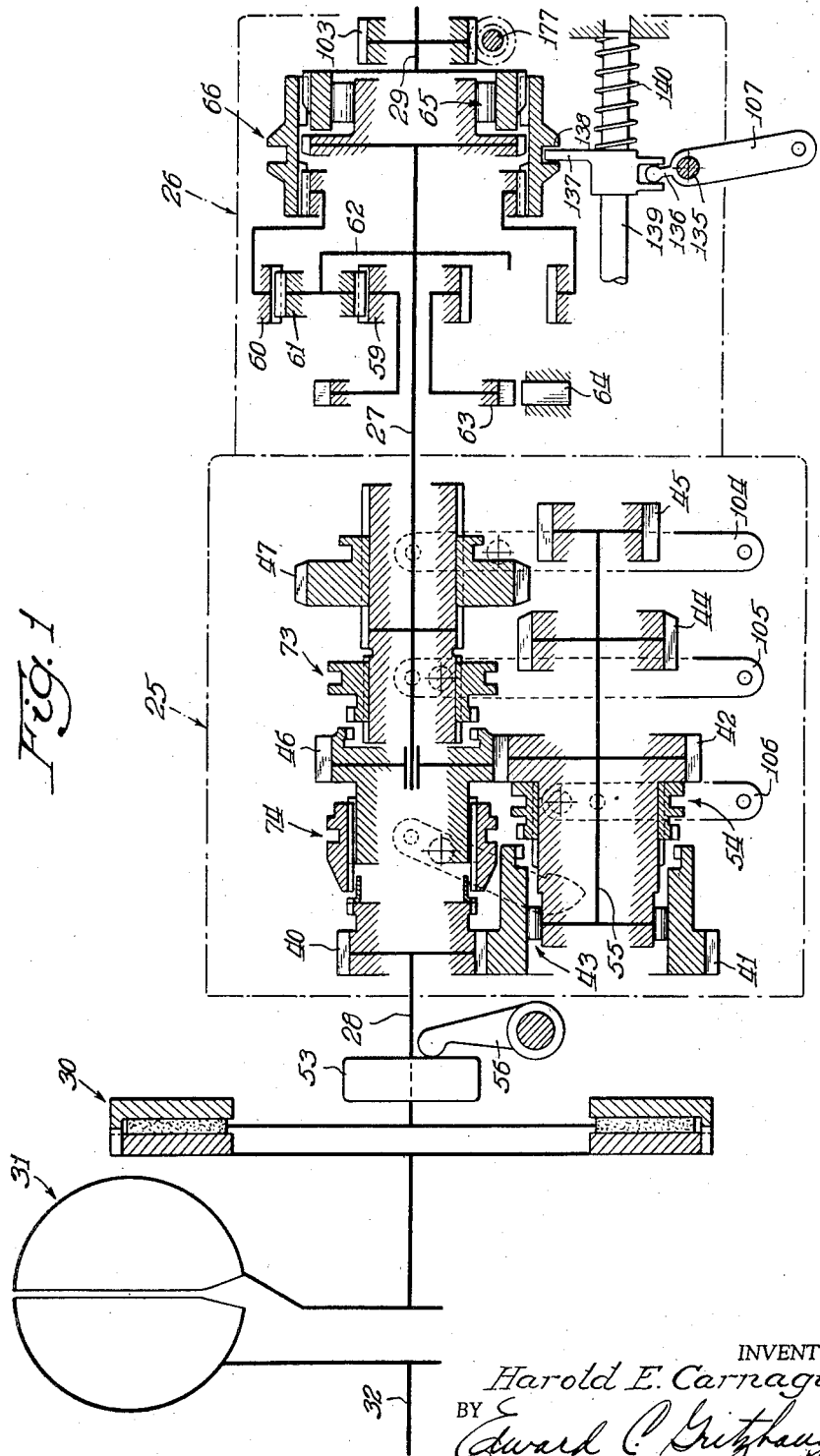
Fig. 1 is a diagrammatic view of the principal mechanical elements of the transmission.

Referring to the schematic assembly diagram shown in Fig. 1 for a general description of the mechanical features, the transmission is comprised of a first unit 25 of the countershaft type, a second unit 26 of the planetary type which is connected to the first unit through an intermediate shaft 27; an input shaft 28, an output shaft 29, a disconnectible friction clutch 30 which is driven by a hydraulic coupling 31 from the crank shaft 32 of a prime mover such as an internal combustion engine (not shown). The hydraulic coupling 31 provides an automatic start from rest, and the clutch 30 serves to disconnect the transmission from the coupling to enable the operator to make such manual shifts as are provided by the transmission.

The first unit 25 is comprised of an input gear 40 directly connected to input shaft 28, a gear 41 mounted on a countershaft 55 and in mesh with input gear 40, a second countershaft gear 42 which is driven from gear 41 through an overrunning clutch 43, two progressively smaller countershaft gears 44 and 45, a gear 46 loosely mounted on intermediate shaft 27 and a gear 47 slidably mounted on said intermediate shaft 27. When gear 47 is slid to the right (Fig. 1) it engages an idler gear (not shown) which meshes with gear 45 on the countershaft to produce a reverse drive in intermediate shaft 27. When gear 47 is slid to the left (Fig. 1) it engages gear 44 on the countershaft to produce a low speed forward drive in intermediate shaft 27. A position of gear 47 intermediate gears 44 and 45 disconnects shaft 27 from the remainder of the transmission to produce neutral.

A jaw clutch 73 provides a means for connecting loose gear 46 to intermediate shaft 27, another jaw clutch 74 is used to connect loose gear 46 to input gear 40 and a third jaw clutch 54 serves to lock up overrunning clutch 43.

The second unit 26 is comprised of a sun gear 59, a ring gear 60, and a plurality of planet pinions 61 meshing with sun gear 59 and ring gear 60. Planet pinions 61 are mounted on a carrier 62 which is rotatable with intermediate shaft 27. Sun gear 59 is connected to, and rotatable with, a slotted member 63 which may be held against rotation by a radially slidable pawl 64, the pawl being rotationally fixed with respect to the slotted member 63. Intermediate shaft 27 may be directly connected to output shaft 29 through an overrunning clutch 65. Ring gear 60 is connected to output shaft 29 to provide an overdrive, the connection being effected through a jaw clutch 66. In order to prevent free wheeling between intermediate shaft 27 and output shaft 29, as for example, in reverse drive, or when the engine is to be used as a brake, it is desirable to lock up free wheeling clutch 65. This is accomplished through a second position of clutch 66 by instrumentalities to be described later.

The gear trains which may be established through the transmission are as follows:

Neutral, low and reverse are obtained by properly positioning gear 47 as described above. In reverse, gear 47 is moved to the right (Fig. 1) and the drive is from gear 40 to gear 41, overrunning clutch 43, countershaft 55, gear 45, the reverse idler, gear 47, intermediate shaft 27, clutch 66 (reverse position) to output shaft 29. In low speed, gear 47 is moved to the left (Fig. 1) and the drive is from gear 40 as before through gear 41, overrunning clutch 43, countershaft 55, gear 44, gear 47, intermediate shaft 27 through overrunning clutch 65 (or positive clutch 66) to output shaft 29.

For second speed, gear 47 is moved to its neutral position and jaw clutch 73 is engaged with gear 46. The drive is then from gear 40 through gear 41, overrunning clutch 43, gear 42, gear 46, clutch 73 to intermediate shaft 27. If pawl 64 of the planetary unit 26 is disengaged from slotted reaction member 63 as shown in Fig. 1, intermediate shaft 27 is directly connected with output shaft 29 either through clutch 66 or overrunning clutch 65 and the second speed is solely effective.

For direct drive, clutch 73 remains engaged and clutch 74 is moved to engage gear 40. The drive is then from gear 40 through clutch 74, gear 46, through clutch 73 to intermediate shaft 27, and, as in the case of second speed, if pawl 64 is disengaged from slotted member 63, a direct drive will be effected to output shaft 29 either through jaw clutch 66 or overrunning clutch 65.

The ratios establishable through planetary unit 26 are direct drive and overdrive, direct drive being obtained as above. When pawl 64 is engaged with slotted member 63, a reaction will be provided for sun gear 59 and an overdrive ratio will then be effected through planet pinions 61 and ring gear 60. If overdrive is established in unit 26 when second speed is effective in unit 25, an overdrive second speed will be established through the transmission as a whole. Similarly, if overdrive is made effective in unit 26 when unit 25 is conditioned for direct drive operation, the overall ratio will be an overdrive direct. The terms "low," "second" and "direct" used hereinafter in the specification and claims refer to the overall speed ratio between input shaft 28 and output shaft 29, it being understood that unit 26 at such times is operated in direct drive and hence merely acts as an extension of output shaft 29 without modifying the ratios obtained in unit 25.

*Detailed description*

Considering now the details of the countershaft unit 25 (Fig. 2), jaw clutch 73 is comprised of a collar 57 which is slidably splined on intermediate shaft 27. Collar 57 is provided with external teeth 58 which are engageable with internal teeth 59 on gear 46. Jaw clutch 74 is comprised of a slidable sleeve 67 which is provided with internal teeth 68 (Fig. 3). Said internal teeth 68 engage external teeth 69 on a hub 70 which is integral with gear 46. Input gear 40 is provided with external teeth 71 which may be engaged by sleeve 67 when the latter is moved to the left (Figs. 2 and 3). Between hub 70 and teeth 71 is a blocker 72 the details of which are shown in Figs. 3 and 3a. The blocker 72 is comprised of a conical friction element 75 which is rotatable with a blocking ring 76, the latter having external teeth 77 which are adapted to be interposed in the path of movement of teeth 68 of sleeve 67. Conical friction element 75 is engageable with a complementary conical surface 78 on gear 40 such that when so engaged the blocker 72 will tend to rotate with gear 40. Ring 76 is provided with a lost motion connection 79 which permits the ring to have a small oscillatory movement with respect to sleeve 67. Thus when sleeve 67 is moved toward engagement with input gear 40, the engaging pressure forces blocker ring 76 toward gear 40 to engage friction element 75 with the complementary element 78 on gear 40. The friction between these two elements drags the ring to the limit of its oscillatory movement in the direction of drive and when so moved, teeth 77 are interposed in front of teeth 68 and hence block further movement of sleeve 67. This condition obtains as long as gear 40 is the driving member. If, however, torque is removed from gear 40 so as to tend to slow it down relative to sleeve 67, it will tend to move in the opposite direction with respect to sleeve 67 and will move with it ring 76. When this happens, teeth 77 are moved out of the way of teeth 68 and the sleeve 67 may pass through into engagement with teeth 71 on input gear 40.

Lock-up clutch 54 is comprised of a collar 80 which is slidably splined on countershaft 55 and rotatable with it. Said collar 80 is provided with external teeth 81 which may be engaged with internal teeth 82 on countershaft gear 41. When so engaged, a direct connection is provided between gear 41 and countershaft 55 and hence overrunning clutch 43 is locked up to secure a two-way drive between gear 41 and countershaft 55.

Figure 9:
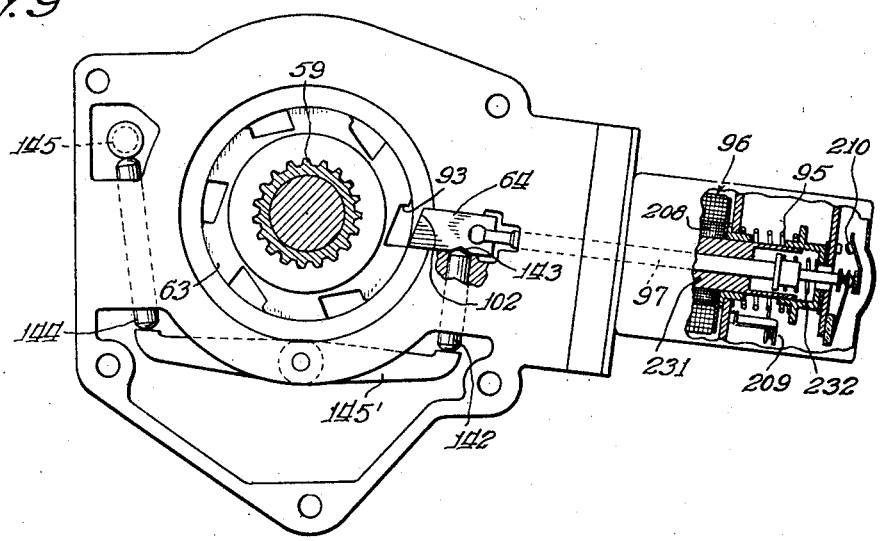
Fig. 9 is an end elevation partly in section through the second unit showing the shift means therefor.

The details of the overdrive unit 26 are shown in Figs. 2 and 9. Referring now to these two figures, clutch 66 is comprised of a slidable sleeve 83 having two sets of internal teeth 84 and 85. Ring gear 60 is rotatable with a support 86 which is provided with external teeth 87 engageable with internal teeth 84 of sleeve 83. Output shaft 29 is provided with an enlarged inner portion 88 having external teeth 89 engageable with internal teeth 85. Thus when clutch 66 is in the position shown, a direct connection is effective between ring gear 60 and output shaft 29.

In the space between internal teeth 84 and 85 are located external teeth 90 formed on the periphery of a hub member 91 which is splined to, and rotatable with, intermediate shaft 27. When sleeve 83 is moved to the right (Fig. 2) so as to engage teeth 84 with teeth 90, teeth 85 remaining engaged with teeth 89 on output shaft 29, a direct two-way connection is established between intermediate shaft 27 and output shaft 29 thereby locking up overrunning clutch 65. When such two-way connection is effective, the planetary gears are rotated as a unit and overdrive is impossible.

The means for effectuating overdrive is shown more clearly on Fig. 9. It is comprised of a disc 63 which is rotatable with the sun gear 59, the disc being provided with a plurality of radially extending slots 93. The radially movable pawl 64, which is rotationally fixed with respect to sun gear 59 is adapted to engage one of the slots 93 of disc 63 to arrest the rotation of said disc and thereby supply a fixed reaction for sun gear 59. The radial movement of pawl 64 is effected in an outward direction by means of a spring 95, and in a radially inward direction by an automatically controlled device 96, a rod 97 serving to connect the pawl 64 with a spring 232 and automatic device 96.

It will be noted that pawl 64 is adapted to engage a slot 93 while slotted member 63 and its associated sun gear 59 are rotating in the same direction as intermediate shaft 27 and that no means is interposed which would in any way interfere with the engagement of the pawl with a slot under such conditions.

A speedometer drive gear 103 (Figs. 2 and 10) is mounted on output shaft 29 and is rotatable therewith. In addition to driving the speedometer said gear 103 also drives a governor which will be described later.

*The manual controls*

Certain ones of the slidable and shiftable elements of the transmission described above are controlled through individual levers which may be moved manually by means of external controls. Referring to Fig. 1, the friction clutch 30, as stated above, is controlled by the usual clutch pedal (not shown). Sliding gear 47 is controlled by a lever 104, jaw clutch 73 is controlled by a lever 105, second speed lock-up clutch 54 is controlled by a lever 106, and overdrive lock-up clutch 66 is controlled by a lever 107. It will be observed from Figs. 1 to 3 inclusive and Fig. 8 that gear 47 is moved to a reverse position by pulling the free end of lever 104 to the left (Fig. 1), neutral position is obtained when the lever is substantially vertical and low speed position is obtained when the lever is moved backward. Jaw clutch 73 is engaged with gear 46 by a backward movement (to the right in Fig. 1) of the free end of lever 105 and is disengaged when the lever is substantially vertical. Lock-up clutch 54 is engaged when the free end of lever 106 is moved forward (to the left in Fig. 1) and is disengaged when the lever is in a substantially vertical position. Overdrive lock-up clutch 66 is engaged when the free end of lever 107 is moved forward and is disengaged when the lever is in a substantially vertical position.

Referring specifically to Figs. 4 and 7, lever 106 is shown connected to a rock shaft 108 on the inner end of which is a crank 109. A yoke 110 is pivoted in crank 109 and engages a groove 111 in slidable sleeve 80 of jaw clutch 54. Opposite crank 109 is a plate 112 which has two recesses 113 and 114 which are engageable by a poppet 115. The poppet serves to locate the lock-up clutch in one or the other of its extreme positions.

Lever 105 (Figs. 5 and 7) is connected to a rock shaft 116 and is provided with a crank arm 117 in which is pivotally mounted a yoke 118 engageable with a groove 119 in slidable collar 57 of jaw clutch 73. Opposite crank 117 is a plate 120 which cooperates with a poppet 121 to locate the two extreme positions of clutch 73.

Referring to Fig. 6, lever 104 is connected to a rock shaft 122 which is provided with a crank 123 in which is pivoted a blade 124 which engages a groove 125 in gear 47. Opposite crank 123 is a plate 126 which cooperates with a poppet 127 locating the three positions of this lever.

In order to prevent the countershaft unit 25 from being shifted into two ratios simultaneously, the interlock mechanism shown in Fig. 7 is employed. This mechanism comprises a walking beam 128 which is pivoted to the casing and is provided with two spaced curved notches 129 and 130, the latter being of substantially greater extent than the former. Pivoted yoke 118, which controls jaw clutch 73, extends through the crank 117 in the form of a pin 131, and pivoted blade 124 likewise extends through crank 123 in the form of a pin 132, pins 131 and 132 extending to the notches 129 and 130. Each notch 129 and 130 is provided with a recess 133 and 134, respectively, to receive pins 131 and 132, respectively, the recesses and notches being so arranged that when pin 131 is in engagement with its recess, pin 132 is free to move along notch 130, and vice versa, but both pins cannot be simultaneously moved along their respective notches.

Referring to Figs. 1, 6, 8, 9 and 10 now for a detailed description of the control for overdrive lock-up clutch 66, it will be observed that lever 107 is connected to a rock shaft 135 which is provided with a crank 136. Said crank engages a yoke 137 which engages a groove 138 in slidable sleeve 83 of the clutch. Said yoke 137 is mounted upon a rod 139 which is normally biased by spring 140 to the left (Fig. 8) which corresponds to released position of clutch 66. Said rod 139 extends forwardly into unit 25 and engages an abutment 141 on crank 123, which, as stated before, controls the forward and reverse gear 47. Thus when lever 104 is pulled forward to shift gear 47 into reverse position, abutment 141 will simultaneously shift rod 139 backward against the action of spring 140 and thereby move sleeve 83 of clutch 66 backward to lock-up position.

An interlock is provided between pawl 64 and clutch 66 so that it would be impossible to shift unit 26 simultaneously into overdrive and lock-up direct drive. The interlock comprises a push rod 142 adapted to engage a notch 143 in pawl 64, another push rod 144 adapted to engage a notch 145 in rod 139, and a walking beam 145' which engages the ends of push rods 142 and 144. The notches, push rods and walking beam are so arranged that when control rod 139 is moved to shift clutch 66 to lock-up position push rod 142 will engage notch 143 and prevent a radial movement of pawl 64, and similarly, when pawl 64 is moved radially inward, push rod 144 engages notch 145 and prevents axial movement of rod 139 to engage clutch 66.

Figure 12:
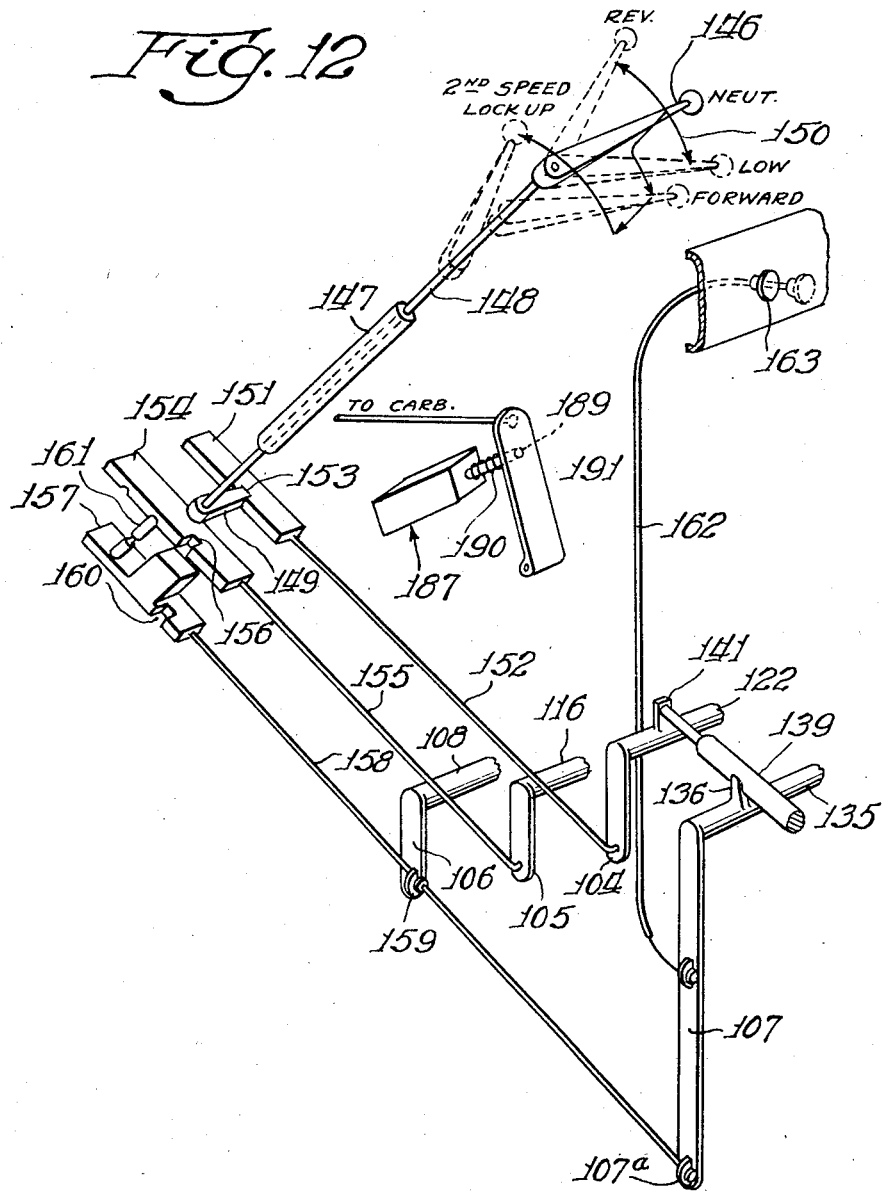
Fig. 12 is a schematic diagram showing the manual controls for the two units.

The external controls for the various levers and the connections thereto are shown in Fig. 12. The principal external control comprises a hand lever 146 located preferably beneath the steering wheel of the vehicle, said lever being rotatably retained in a support 147. A rod 148 connects lever 146 to a second lever 149 located under the floor of the vehicle. A preferred control motion for lever 146 is that shown in outline at 150 wherein neutral is obtained by positioning the lever 146 in substantially the middle of its travel, reverse is obtained by raising the end of the lever and pushing it counter-clockwise with respect to the steering wheel, low speed is secured by raising lever 146 and pulling clockwise to the position shown dotted, forward is obtained by pushing downward on the lever when it is in neutral and then pulling forward to the dotted position marked "Forward" and the lock-up clutch 54 is operated by pushing downward on the end of lever 146 when it is in forward position and then rotating it counter-clockwise to the dotted position marked "2nd Speed Lock-Up."

The movement of lever 146 to reverse position is transmitted to reverse shift lever 104 through a rail 151 and a rod 152, rail 151 being provided with a notch 153 which is engageable by the end of lever 149. Neutral and low are obtained through the movement of the same instrumentalities. Forward speed, which corresponds to second speed and requires that clutch 73 be engaged with gear 46, is obtained through a shift rail 154 and a rod 155, connected to forward speed lever 105, said rail 154 being provided with a notch 156 which is engageable by the end of lever 149 when the latter has been positioned in neutral. The double shift for second speed lock-up is transmitted to levers 106 and 107, which control respectively, the second speed and overdrive lock-up clutches, by means of a third shift rail 157 and a rod 158 which passes through an apertured lug 159 to a lost motion connection 107a on lever 107. Shift rail 157 is likewise provided with a notch 160 which is engageable by the end of lever 149 when the latter has been moved to forward position and then pushed downward. An interlock mechanism 161 of any suitable character may be employed between rails 154 and 157 to maintain one rail in place while the other is moving, thereby to prevent disengagement of clutch 73, which, when disengaged, would destroy the drive through second speed.

For a push start, wherein the engine is started by pushing the vehicle, it is desirable to use direct drive through the transmission. This requires that lock-up clutch 66 of the overdrive unit 26 be operated independently of the second speed lock-up clutch 54. This is accomplished through the lost motion connection 107a on lever 107 and by providing a separate Bowden wire control 162 with a button 163 on the dash, the connection between the bowden wire 162 and lever 107 likewise being a lost motion connection.

The automatic controls

Figure 11:
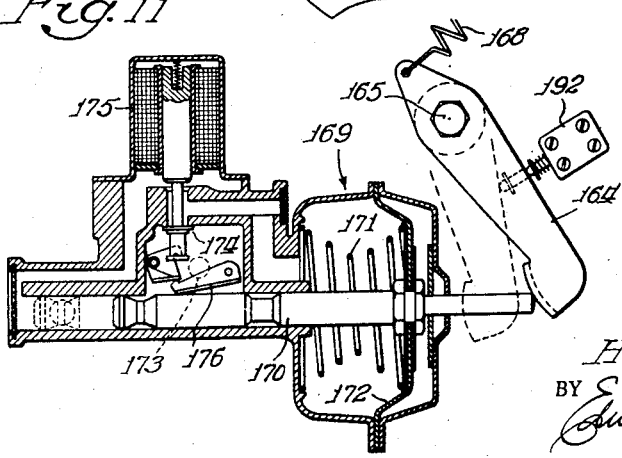
Fig. 11 is a cross-section through the automatic control device for the first unit.

The manual controls just described are effective only to second speed and all speeds above second are secured automatically. Since the transmission can be operated from a standing start in second speed, movement of hand lever 146 to second speed position is equivalent to conditioning the transmission for forward drive. The automatic controls for securing speeds above second are as follows, reference being made to Figs. 4, 6, 9, 10 and 11:

The control for jaw clutch 74, which controls the shift from second speed to direct drive and back again, comprises an arm 164 which is connected to a rock shaft 165, the latter being provided with a crank arm 166 in which is pivotally mounted a yoke 167 which engages sleeve 67 of clutch 74. A spring 168 normally biases arm 164 in a clockwise direction (Fig. 11) to engage clutch 74 for direct drive. The action of spring 168 is opposed by an electrically controlled vacuum operated device 169 which is shown in Figs. 6 and 11. This device is comprised of a rod 170 which is urged by a spring 171 in a direction to oppose spring 168, thus to shift jaw clutch 74 to second speed position, spring 171 being stronger than spring 168. The action of spring 171 is in turn opposed by a pressure differential operated diaphragm 172, one side of which is adapted to be connected to a vacuum line 173 through a valve 174. The movement of the valve is in turn controlled by a solenoid 175 in a manner hereinafter to be described. When the rod 170 has once been moved by the pressure differential diaphragm 172, it is latched in position by means of a latch 176 which thereafter renders the rod independent of fluctuations of vacuum.

Associated with vacuum unit solenoid 175 is an ignition interrupting switch 223 which is shown in detail in Fig. 6. It is actuated by movement of rod 170 so as to break the circuit to the ignition just prior to the engagement of the rod with direct-second lever 164 and then, as the lever is moved to disengage clutch 74, the ignition circuit is again restored.

The automatic control for the overdrive unit is shown in Fig. 9 and comprises a solenoid 96 provided with a holding coil 208 which when energized pushes pawl rod 97 radially inward by means of an armature 231 and spring 232 acting upon rod 97. A switch 209 is operated by movement of rod 97 to break the circuit through solenoid 96 when pawl 64 is engaged with its slot 93, and a switch 210 is likewise operated by movement of pawl rod 97 to close a conditioning circuit for a downward change in speed.

The shifts above second speed are made automatically but under the control of the operator to produce direct drive at speeds ranging from approximately 12 m.p.h. to 23 m.p.h., overdrive second or overdrive direct at the operator's option at speeds ranging from approximately 23 m.p.h. to approximately 35 m.p.h., and overdrive direct at speeds above 35 m.p.h. It is also contemplated that down shifts will be made automatically under the control of the operator from overdrive direct to direct drive at speeds above 35 m.p.h., and from overdrive direct to overdrive second and immediately thereafter at the option of the operator to second speed at speeds ranging from 35 m.p.h. to 23 m.p.h. and a further down shift from direct to second at speeds ranging from 23 m.p.h. to 12 m.p.h. These combinations of speeds are controlled primarily by the joint action of a speed controlled switch or governor 178 (Fig. 10) and a throttle controlled switch 187 (Fig. 12). Other switches are provided which operate in conjunction with certain of the shift levers, or are manually controlled, to further modify the joint controlling action produced by the governor and throttle switch.

Figure 10:
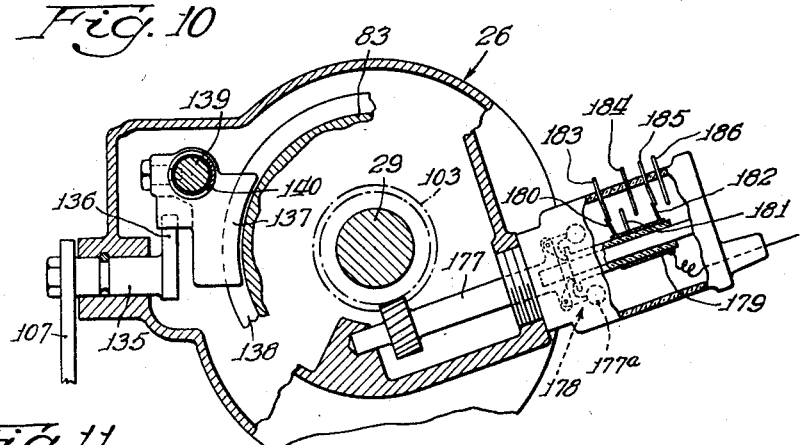
Fig. 10 is an end elevation of the second unit partially in section showing the drive for the governor.

The governor switch is shown schematically in Fig. 10 and comprises a shaft 177 which is driven from speedometer drive gear 103 and output shaft 29 so as to be responsive to the speed of the output shaft. Obviously the governor could be driven from some other shaft or part which is movable with the vehicle. Shaft 177 drives one or more weights 177a which are pivoted to the shaft and are adapted to swing outwardly when shaft 177 is rotated. Weights 177a move a rod 179 to which are secured a plurality of switch arms 180, 181 and 182. Said switch arms cooperate with fixed contacts 183, 184, 185 and 186 to effect changes in the electrical circuit to the overdrive solenoid 96 and second-and-direct speed control solenoid 175 which will produce low speed up to 12 m.p.h., direct drive up to 23 m.p.h., overdrive above 23 m.p.h., downshift to second below 35 m.p.h., and downshift to direct only above 35 m.p.h. respectively.

The throttle switch 187 is shown in Fig. 12 and comprises a plurality of individual switches operated by a rod 189 which may be pushed inwardly against the action of a spring 190 by the accelerator pedal 191. The contacts are arranged to be operated at three critical positions of the accelerator pedal, namely, (1) substantially closed position, (2) substantially one-half open position and (3) substantially fully opened position. The last named position is the downshift position for both transmission units and the other two positions are conditioning positions for the downshifts.

A direct-second switch is provided which is controlled by the lever 164 for operating direct-second jaw clutch 74. This switch is shown in Fig. 11 at 192 and controls the downshift into second speed from overdrive direct speed. This switch compels a sequence of downshifts from overdrive direct to overdrive second and then to second speed instead of a conventional and less desirable sequence comprising a shift from overdrive direct to direct and then to second speed.

A forward-and-reverse interlock switch is provided which renders an automatic shift into direct impossible when the transmission has been manually shifted to low, neutral or reverse positions. This switch is shown in Fig. 7 at 193 and is comprised of a rod 194 which engages an extension 195 on walking beam 128 of the interlock mechanism so as to be controlled by movement thereof.

A third switch is provided which likewise prevents a shift into direct drive, this switch being operated in conjunction with the second speed and overdrive lock-up clutches 54 and 66. It is shown in Fig. 7 at 196 and comprises a rod 197 which cooperates with plate 112 in such a manner that when the transmission is conditioned for lock-up, the switch will prevent the operation of jaw clutch 74 to produce direct drive as aforesaid.

The electrical controls also include various relays which cooperate with the overdrive and second speed-and-direct drive controls and with the governor and other switches to control the operation thereof all as will be hereinafter described in detail. These relays may be mentioned here briefly as an overdrive relay, an ignition break relay, a distributor relay, and a delayed action relay.

The circuit diagrams

Figure 13:
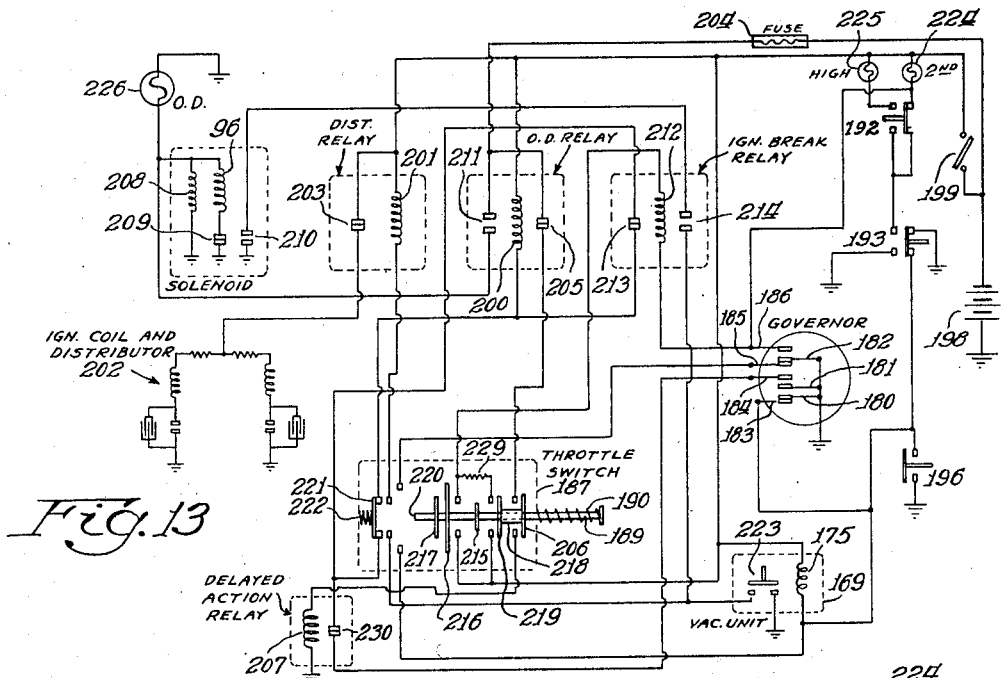

The connections between the electrical elements which cooperate to provide the necessary functions for the transmission are shown in Fig. 13. These comprise, among others, a power circuit from a battery 198 through an ignition switch 199 to solenoid 175 (hereinafter termed "vacuum unit") which it will be remembered controls the shift from second to direct; another power circuit to the overdrive relay 200, a third power circuit to the distributor relay 201, and a fourth power circuit to the ignition system 202 through the normally closed contacts 203 of distributor relay 201. The ignition system illustrated is of the variety used on multiple cylinder engines of the V-type. It is to be understood that the wiring diagram is applicable equally as well to ignition systems used on other types of engines.

Another power circuit is established from battery 198 through a fuse 204, and normally closed contacts 205 of overdrive relay 200 to the throttle switch 187. Said throttle switch 187 is provided with a switch 206 which when operated completes the power circuit to delayed action relay 207. The direct-second switch 192, the reverse neutral, low and forward switch 193 and the lock-up switch 196 are shown schematically in Fig. 13 at the right hand side of the figure. In the upper left hand corner of Fig. 13 are shown the overdrive solenoid 96, holding coil 208, solenoid release switch 209, and ignition break control switch 210. The overdrive relay is provided with a second pair of contacts 211 which control the energization of overdrive solenoid 96. The ignition break relay comprises a coil 212 and two sets of contacts 213 and 214, the contacts 213 controlling one of the paths for the energization of overdrive relay 200 and the other set 214 controlling the ignition break circuit.

Throttle switch 187 as stated previously, is comprised of a rod 189 to which are secured switch arms 215, 216 and 217. Switch 206 is mounted on a collar 218 which is slidable on rod 189 and to which is secured a switch arm 219 so as to be movable with switch 206. The end 220 of rod 189 operates a switch 221 which is normally made by means of a spring 222 operating in opposition to rod 189. Switch 206 controls a circuit through delayed action relay 207. Switch 219 controls the holding circuit through ignition break relay coil 212. Switch 215 controls the energization of the coil 212. Switch 216 controls the down shift in the vacuum unit, switch 217 establishes the circuit through distributor relay coil 201 to interrupt the ignition circuit and switch 221 controls the second path for energizing overdrive relay coil 200.

Provision is also made in the electrical circuit for indicator lights to indicate the ratio which is operative at any instant. Thus a second speed light 224, a high speed light 225, and an overdrive light 226 are provided all of which are shown at the top of Fig. 13.

In Fig. 13 all of the elements are shown in the condition which obtains before the ignition switch 199 is turned on and while the car is standing still in neutral. It will be recalled that when in neutral, low or reverse, switch 193 is moved to render impossible a shift into direct. This is accomplished by providing a ground through the switch for vacuum unit solenoid 175 so that when ignition switch 199 is turned on to complete the circuit through the solenoid, the solenoid will remain operated thereafter and will not permit a shift into direct drive. Similarly, when the transmission is shifted to second speed wherein switch 193 is moved to the left (Fig. 13) to remove ground from solenoid 175, a shift into direct by the governor may still be rendered impossible by means of lock-up switch 196 which operates in conjunction with lock-up clutches 54 and 66. It will be observed that switch 196 supplies the ground to solenoid 175 which was removed when switch 193 was shifted to the second speed position, that is, to the left.

Having described the general function of the various elements of the circuit, the cooperation between the elements under the conditions pertinent to this invention will now be detailed.

Figure 14:
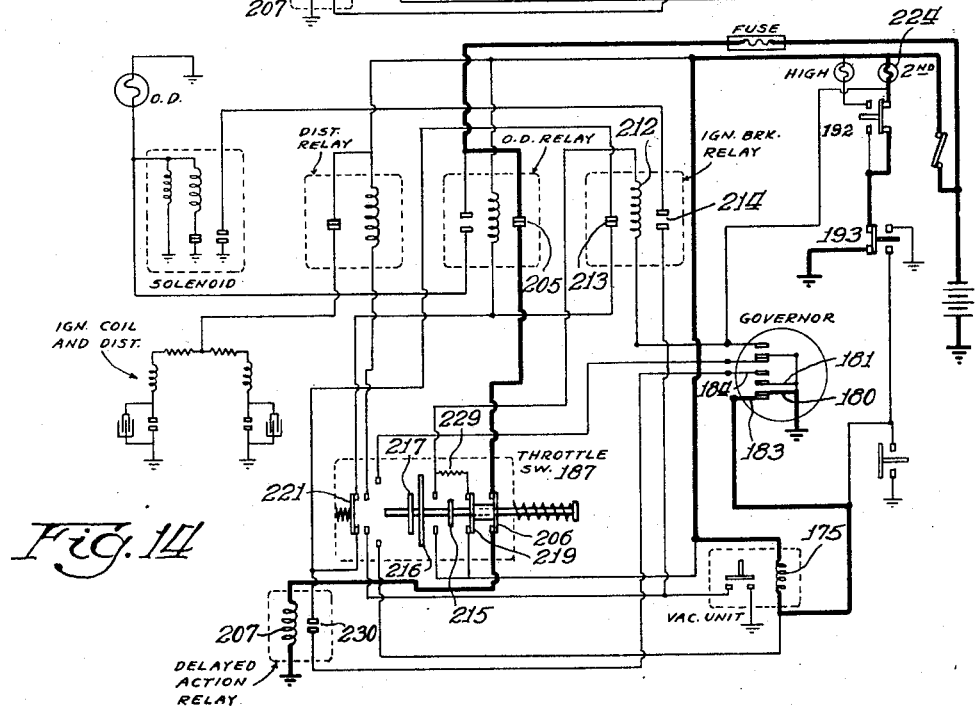

*Ignition on, vehicle moving less than 12 m.p.h.*—Fig. 14 shows the condition of the circuit when the ignition has been turned on and the car is moving at a speed less than 12 m.p.h., which is the critical speed for the first operation of the governor switch. It will be assumed in this condition and in the subsequent conditions that the manual control lever at the steering column has been moved to shift the transmission into forward speed which as we have seen previously is in reality the position for second speed through the first unit 25. Switch 193 is therefore in its left-hand position (Fig. 14), which puts ground on one side of direct-second switch 192. When the ignition switch is turned on a circuit is completed through the second speed light 224 thereby indicating to the operator that the transmission is conditioned for second speed operation. At the time the ignition circuit was turned on a second circuit was completed through solenoid 175 of the vacuum unit and contact 183 and the switch arm 180 of the governor, which operated the pressure differential device in the vacuum unit to allow spring 171 to shift jaw clutch 74 to second speed position, that is, to disconnect input gear 40 from gear 46. Upon depressing the throttle to start the car moving, switch 206 of throttle switch 187 completed a circuit to delayed action relay 207 through contacts 205 of overdrive relay 200. The battery was also connected to one of the contacts operated by each of the switches 215 and 219. Switch 219 was of course, operated with switch 206 and completed a circuit through a resistance 229, coil 212 of ignition break relay and switches 192 and 193 to ground. The ignition break relay did not operate, however, since resistance 229 did not permit sufficient current to pass through coil 212 for this purpose. Delayed action relay 207 was also operated but did not effect any change in the remainder of the circuit since the circuit controlled by contacts 230 of the relay is still open through the governor contact 184 and arm 181.

During the normal operation of the throttle, any of the remaining switches 215, 216, 217 and 221 operated by throttle switch 187 may be operated, but it will be observed that as long as the circuit through the governor switch 180 and contact 183 is completed and the remaining circuits through the governor are as shown, no change will be effected in the operation of the transmission. Thus although movement of the throttle switch 187 to a position corresponding to one-half throttle will cause switch 216 to complete the circuit through the ignition break relay coil 212 and operate the relay, the contacts 213 and 214 controlled by the ignition break relay affect circuits which are broken elsewhere and cannot be completed until some other instrumentality operates.

*Vehicle moving between 12 m.p.h. and 23 m.p.h.*—Fig. 15 shows the changes which will be effected in the circuit when the vehicle moves at a speed included in the range between 12 m.p.h. and 23 m.p.h. Assuming that the throttle switch 187 is in the position shown solid, it will be observed that the circuit through delayed action relay 207 is again completed through overdrive relay contacts 205 and switch 206. Contacts 230 therefore are open as shown in solid lines. Upon reaching 12 m.p.h. however, the governor switch has shifted so as to break the connection between switch arm 180 and contact 183, thereby removing ground from the vacuum unit solenoid 175 and deenergizing this solenoid. As long as torque is applied to clutch 74, however, the clutch will not release and therefore as long as throttle switch 187 is in the position shown solid no shift to direct will be effected.

To complete the shift, torque is removed from direct-second clutch 74 by releasing the throttle, which likewise releases switch 206. When the torque has been relieved for a time which is sufficient to permit blocker 72 to move out of the way, jaw clutch 74 will be operated by spring 168 to effect direct drive through the transmission. The throttle may then be again operated to accelerate the vehicle and delayed action relay 207, which was deenergized when the throttle was released, will again be energized. The operation of jaw clutch 74 to provide direct drive likewise operates direct-second speed switch 192 to remove ground from the ignition break relay coil 212 and the switch 192 assumes the position shown dotted in Fig. 15, thereby completing a circuit through the high speed light to indicate to the operator that the transmission is conditioned for direct drive. With ground removed from the ignition break relay coil 212, the subsequent operation of throttle switch 187 to one-half throttle position to operate switches 215 and 219 has no effect upon the ignition break relay although the delayed action relay will alternately operate and deenergize in accordance with the movement of the throttle switch to partially operated and released position. It is assumed in the condition shown in Fig. 15 that the throttle switch is not moved to its downshifting position, that is, to the extremely wide open position of the throttle.

*Vehicle moving between 12 m.p.h and 23 m.p.h. with throttle switch in down shift position.*—The next condition is shown in Fig. 16 and illustrates the circuits established when throttle switch 187 is moved to its downshifting position while the car is moving at speeds ranging from 12 m.p.h. to 23 m.p.h. It will be remembered that the transmission is operating in direct drive and since none of the remaining speeds has been operated, the only downshift possible is to second speed. Accordingly, to effect the downshift it is necessary to restore ground to solenoid 175 of the vacuum unit to operate the vacuum valve 174 and latch 176 controlled thereby and thus permit spring 171 to push rod 170 and its cooperating lever 164 to release jaw clutch 74. The release of jaw clutch 74 cannot be accomplished under torque and hence the ignition circuit must likewise be opened to destroy driving torque. Referring now to Fig. 16 it will be observed that when throttle switch 187 is in downshift position, switches 216 and 217 are effective to complete their respective circuits, switch 216 restoring ground to solenoid 175 through contact 185 and arm 182 of the governor switch and switch 217 completing the circuit through distributor relay coil 201 subject however, to the operation of ignition break switch 223 associated with rod 170 of the vacuum unit. Because of a slight backlash provided between rod 170 and lever 164, the rod will move slightly upon the initial operation of solenoid 175 and this slight movement is sufficient to operate switch 223 to complete the circuit through distributor relay coil 201. The operation of the distributor relay opens contacts 203 of the distributor relay and breaks the circuit to the ignition system 202 with a resulting torque release on jaw clutch 74. The vacuum unit then completes the shift and in completing the shift again opens switch 223 which deenergizes distributor relay coil 201 and reestablishes the ignition circuit.

The shift from direct drive to second speed operated switch 192 associated with direct-second shift lever 164 to break the circuit through the direct speed indicator light and to reestablish the circuit through the second speed light, and to put ground on coil 212 of ignition break relay as before.

The transmission will operate in second speed as long as the car is moved between 12 m.p.h. and 23 m.p.h., and upon a subsequent release of the throttle and the associated throttle switch 187, the latter will move away from its downshift position and will release switches 216 and 217 to break the circuits therethrough. This again removes ground from the vacuum unit solenoid 175 to cause the unit to shift lever 164 to direct drive position. Upon a release of torque sufficient to effect a movement of blocker 72 out of blocking position, direct drive will again be established.

Figure 17:
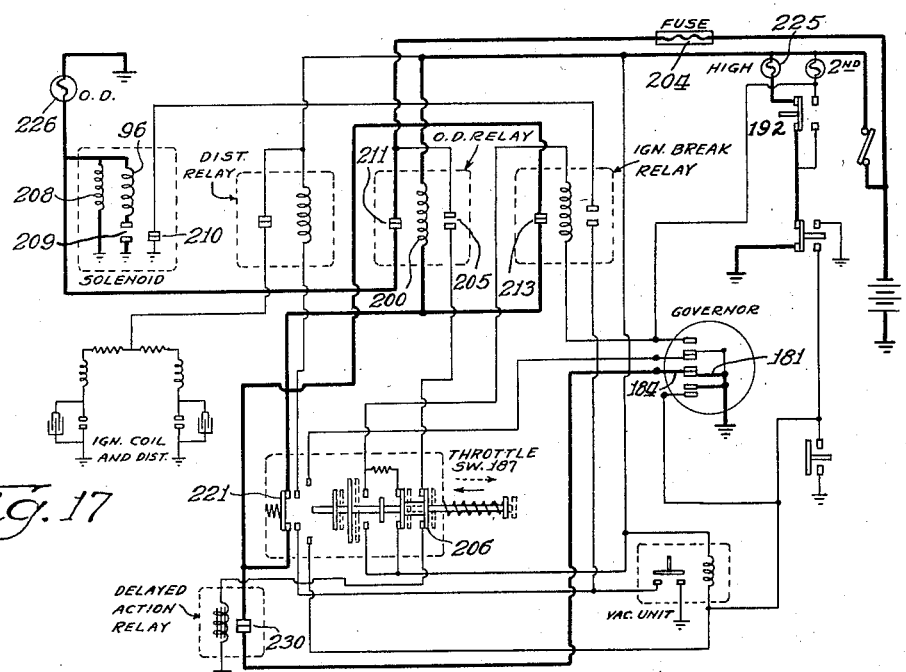

*Vehicle moving in direct above 23 m.p.h.*—The condition of the circuit which obtains when the vehicle is traveling above 23 m.p.h. is shown in Fig. 17. It is assumed that the transmission has been shifted to direct drive before a vehicle speed of 23 m.p.h. had been reached. The principal change effected at this critical speed is the automatic completion of a circuit through governor switch arm 181 and its associated contact 184. It will be assumed in connection with Fig. 17 that the throttle switch is not operated to its downshifting position. Initially, however, switch 206 of throttle switch 187 had been operated to complete a circuit as before through the overdrive relay contacts 205 to operate the delayed action relay and open contacts 230. Thus when the governor switch operated to complete the circuit therethrough as aforesaid, the remainder of the circuit remained open because of the opening of contacts 230. With a subsequent release of the throttle to the dotted position shown, delayed action relay 207 is deenergized and after a predetermined time delay, contacts 230 are closed. This establishes a circuit through two paths to overdrive relay coil 200 to operate the overdrive relay. One of the paths is through switch 221 directly to the coil 200 and the other path is around switch 221, through contacts 213 of the ignition break relay to coil 200. The energization of overdrive relay coil 200 closed contacts 211 and thereby completed the circuit through solenoid 96 of the overdrive control system to push the pawl 64 into engagement with slotted element 63. This stopped the rotation of sun gear 59 and established overdrive. The movement of pawl 64 into engagement with a slot 93 simultaneously opened contacts 209 to deenergize solenoid 96, and closed contacts 210 to condition the circuit for a subsequent downshift. The pawl is held in engaged position by holding coil 208.

It will be observed that the circuit through the overdrive relay coil 200 was not established until the throttle had been released. Simultaneously with the release of the throttle, intermediate shaft 27 was slowed down and was permitted, by delayed action relay 207, to continue slowing down for the period provided for by the delay in closing contacts 230. The movement of the pawl into engagement with a slot 93 therefore occurred when slotted element 63 was rotating slowly and was possible without further delay when the overdrive relay was energized.

The energization of overdrive relay coil 200 and the closing of its contacts 211 also completed a circuit through overdrive indicator lamp 226, and since direct drive lamp 225 had already been turned on, the operator was then apprized of the fact that the transmission was conditioned for overdrive direct operation. The throttle may thereafter be operated in the normal manner without effecting any change in the transmission so long as the downshift position is not reached.

Figure 18:
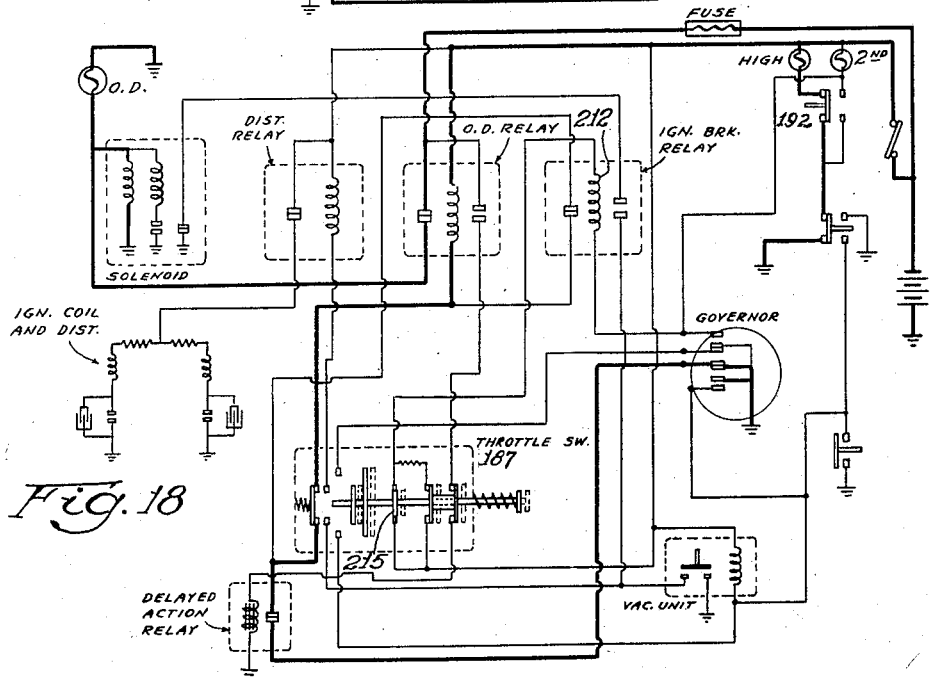

*Vehicle moving between 23 and 35 m.p.h. in high overdrive with the throttle in one-half throttle position.*—It is contemplated that this invention will be used with a transmission wherein two successive downshifts are possible in a speed range of approximately 23 m.p.h. to 35 m.p.h. Fig. 18 shows the condition of the circuit when the vehicle is moving within this range in overdrive direct and the throttle has been moved to one-half throttle position before the first downshift. It will be observed that under these conditions the completion of the circuit through switch 215 has no effect upon the circuit or the operation of the transmission due to the fact that direct-second switch 192 removes ground from ignition break relay coil 212 when the first unit 25 of the transmission is in direct drive.

*Vehicle moving between 23 and 35 m.p.h. in overdrive direct with throttle in first down-shift position.*—Fig. 19 shows the condition of the circuit when the throttle switch 187 has been moved to its downshifting position for the first time after the transmission has been shifted to overdrive direct. In this position the circuits through switches 216 and 217 are completed and the circuit through switch 221 is broken. It will be recalled that switch 221 provided one of two paths to overdrive relay coil 200 and that a second circuit was provided for this coil around switch 221 through contacts 213 of ignition break relay coil 212. The breaking of the circuit through switch 221 therefore has no effect on the overdrive relay and the latter remains energized through contacts 213 of the ignition break relay. No change is therefore effected in holding coil 208 of the overdrive solenoid and pawl 64 remains engaged with its slotted member 63 for overdrive operation. The ignition break relay coil 212 remains deenergized as long as direct-second switch 192 remains in the left-hand position (Fig. 19).

The completion of the circuit through switch 216 establishes a ground connection for vacuum unit solenoid 175 through contact 185 and switch arm 182 of the governor switch. The completion of the circuit through switch 217 again completes the circuit through distributor relay coil 201 subject to the operation of ignition break switch 223 associated with the vacuum unit. Jaw clutch 74 will therefore be moved to disengage direct drive and permit second speed to become effective as shown in Fig. 16.

*Vehicle moving between 23 and 35 m.p.h. in overdrive second after first downshift.*—It will be noted that when the vacuum unit has down shifted clutch 74, direct-second switch 192 is moved to its second speed position which extinguishes the direct drive light and reoperates the second speed light. It also establishes a ground circuit to ignition break relay coil 212.

Referring now to Fig. 20, wherein throttle switch 187 is shown in its mid-position after the first downshift, it will be observed that switch 215 is operated to complete a circuit therethrough and that switch 219 had been previously operated when the throttle was moved to partially open position. The circuit through switch 215 applies battery to ignition break relay coil 212 and operates the relay to open contacts 213 and close contacts 214. This breaks the second circuit which had been provided for overdrive relay coil 200 and completes, through contacts 214, a circuit through distributor relay 201 subject, however, to the operation of switch 217. The circuit is now conditioned for a second downshift and although switch 215 may thereafter move to break the circuit therethrough, ignition break relay coil 212 will nevertheless remain energized through resistance 229 and switch 219 which remains operated at all times except when the throttle is in closed position.

Figure 21:
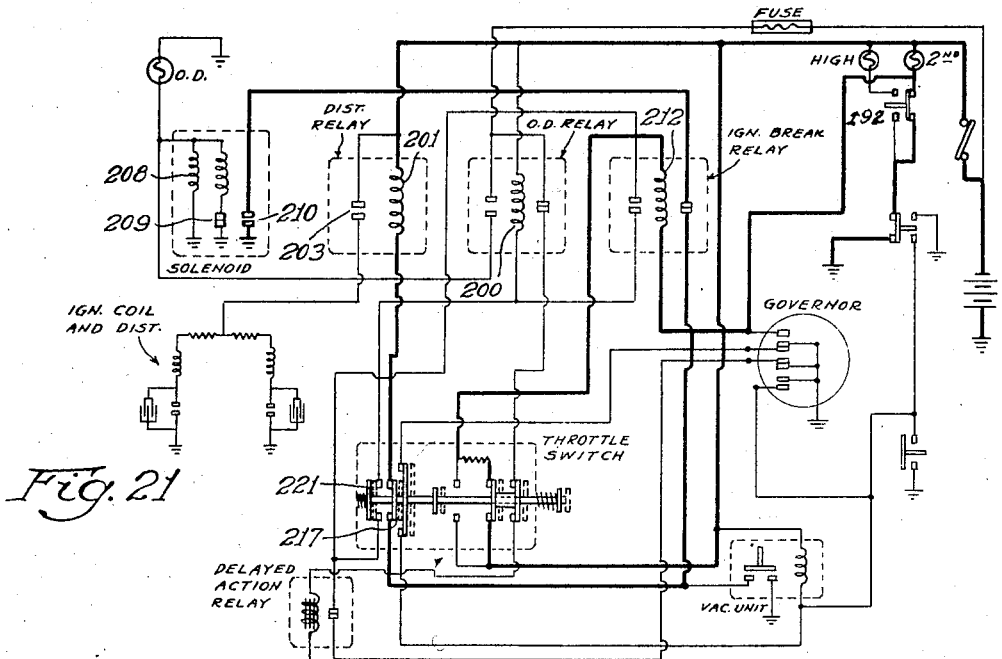

*Vehicle moving between 23 m.p.h. and 35 m.p.h. in overdrive second after first downshift and circuit conditioned for second downshift.*—The condition of the circuit when the throttle switch 187 is moved to its downshifting position a second time after having been moved to one-half throttle position is illustrated in Fig. 21. The first operation effected is the opening of switch 221 which opens the only remaining circuit to overdrive relay coil 200 and therefore deenergizes the relay. This likewise deenergizes holding coil 208 of the solenoid and permits spring 95 to bias the pawl 64 to disengaged position. The pawl will not move, however, until there is an interruption of torque. The interruption is accomplished by the immediately following completion of the circuit through switch 217 to distributor relay coil 201 which then becomes energized and opens contacts 203, thereby opening the ignition circuit. The movement of pawl 64 radially outward to disengaged position closes contacts 209 and opens contacts 210 to deenergize distributor relay coil 201, thereby reestablishing the ignition circuit and permitting forward movement of the vehicle in second speed.

*Vehicle moving above 35 m.p.h.*—Above 35 m.p.h. a downshift into overdrive second would merely cause the engine to rotate at an excessive speed without materially increasing the torque and speed of the vehicle. It is desirable therefore above this speed to prevent a downshift into overdrive second or into second. This is accomplished as shown in Fig. 22.

Figure 22:
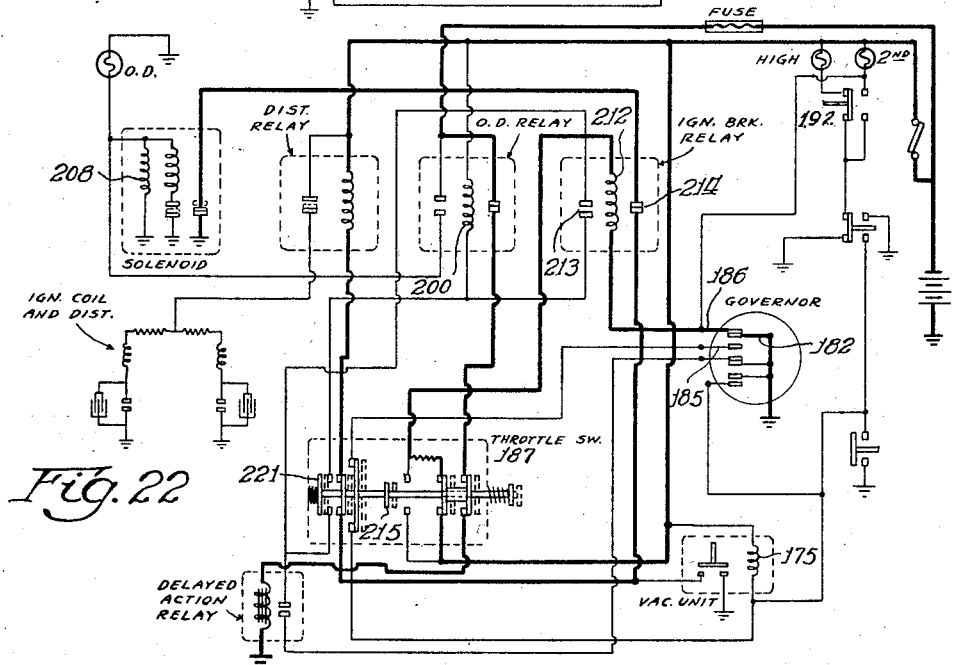

In Fig. 22 the circuit is shown with throttle switch 187 in its downshifting position and the vehicle moving above 35 m.p.h. in overdrive direct. It will be remembered that a downshift into direct drive was rendered impossible in Fig. 21 because direct-second switch 192 had been moved to remove ground from ignition break relay coil 212 and that ground was not established until the vacuum unit had operated clutch 74 to provide second speed. It will also be remembered that a downshift through the vacuum unit was made possible by the completion of a circuit through contact 185 and switch arm 182 of the governor switch. Accordingly, above 35 m.p.h. the governor switch is so arranged that switch arm 182 breaks the connection with contacts 185 and establishes a circuit through contact 186, the change being effected substantially instantaneously. This provides the ground for coil 212 which had been removed by switch 192, and it removes the ground which was required for the operation of vacuum unit solenoid 175. The positioning of throttle switch 187 to its downshift position under these conditions therefore releases overdrive relay coil 200 through the switch 221 as before to deenergize holding coil 208 and thereby to permit pawl 64 to move outwardly to release sun gear 59.

It is assumed in Fig. 22 that throttle switch 187 will have been moved at one time or another during the normal operation of the vehicle to one-half throttle position wherein switch 215 completes the circuit through ignition break relay coil 212 to close its contacts 214 and open contacts 213 controlling one of the circuits to overdrive relay coil 200.

*Operation*

The operation of the individual units of the transmission has been described elsewhere in this specification both as to the means used to obtain changes in speed and the controls for effecting the speed changes. For this reason a detailed description of the operation of the transmission is believed to be unnecessary.

The transmission provides five speeds forward, neutral and reverse. Hydraulic coupling 31 permits automatic starts in any of the speeds. Disconnectible clutch 30 permits shifts to be made between neutral, reverse, first and second speeds. The speeds above second speed are automatic and are controlled jointly by the speed controlled switch and by the operator, both as to upshifts and downshifts. The upshift to overdrive is mechanically instantaneous in operation but is delayed electrically to permit the pawl and slotted member to approach synchronism before becoming effective. Downshifts are normally made to the next speed as determined by the governor with the exception of the double shift which is made possible by the novel combination of throttle control switches and relays. The electrical circuit is rendered inoperative to effect up-shifts when the transmission is locked up in second speed two-way drive.

It is understood that the foregoing description is merely illustrative of a preferred embodiment of the invention and that the scope of the invention is not to be limited thereto, but is to be determined by the appended claims.

I claim:

1. A variable speed transmission comprising in combination input and output shafts, a countershaft type unit having low, second and direct drive ratios, and a planetary type unit having direct drive and overdrive ratios, said units being connected in tandem between said shafts, a governor responsive to the speed of one of said shafts, and automatically controlled means under the control of said governor for effecting shifts between second and direct drive in the countershaft unit, and between direct drive and overdrive in the planetary unit, said means being adapted to effect shifts from second to direct to overdrive direct.

2. A transmission comprising input and output shafts, a plurality of gear trains connectible between the shafts to provide a plurality of forward speed ratios, means controlled jointly by the speed of a member associated with the transmission and by the operator for effecting down shifts, a manually operated lever, a switch operated from the lever and having a plurality of contacts controlled by the position of the lever, one set of contacts being operated at substantially the limit of movement of the lever in one direction, and another set of contacts being operated at substantially mid-position of the lever, said down shift means, within a predetermined range of speeds of the speed controlled member, effecting a down shift to a higher speed ratio upon movement of the lever to its limiting position in said one direction, and effecting a down shift to a still higher ratio upon successively positioning the lever to its mid-position and then to the said limiting position.

3. A transmission as described in claim 2, a vehicle speed control, and means connecting the lever to the vehicle speed control to operate the switch and speed control simultaneously.

4. A variable transmission including positively interengageable elements for effecting a change in the transmission, electro-magnetic means for urging one of the elements toward engagement with the other element, automatic speed controlled means for conditioning the electromagnetic means for operation, an accelerator pedal, a switch controlled by the pedal so as to be inoperative to effect a change in the electromagnetic means until the pedal is substantially in closed position, and a delay relay interposed between the switch and electromagnetic means to delay the energization of the electromagnetic means, whereby to permit the elements to approach synchronism before engaging.

5. A variable transmission unit comprising input and output shafts, an overrunning connection between the shafts, a planetary gear connection alternatively connectible between the shafts, said planetary connection including a slotted reaction member, a rotationally fixed radially slidable pawl engageable with the slotted member, electromagnetic means for urging the pawl into engagement with the slotted member, speed controlled means for conditioning the electromagnetic means for operation, an accelerator pedal, a switch controlled by the pedal so as to be inoperative to effect a change in the electromagnetic means until the pedal is in closed position, and a delay relay interposed between the switch and electromagnetic means to delay the energization of the electromagnetic means, whereby to permit the slotted member to slow down before being engaged by the pawl.

6. A variable speed transmission device comprising a shiftable element adapted to effect a speed change through the transmission, a solenoid for actuating the element, a relay for energizing the solenoid, speed controlled means adapted to condition the relay for operation above a predetermined operating speed of the transmission, a delayed action relay which when deenergized establishes an energizing circuit through the solenoid relay in conjunction with the speed controlled means, a switch on the solenoid relay which is operative to energize the delayed action relay when the solenoid relay is deenergized, and a manually controlled switch in series with a solenoid relay switch and the delayed action relay, said manually controlled switch being adapted to maintain the delayed action relay operated over all but a narrow portion of its entire range of movement.

7. A variable speed transmission device as described in claim 6, a throttle lever and means for operating the manually controlled switch in unison with the throttle lever, the range of movement during which the delayed action relay is inoperative corresponding to a small range of movement of the throttle lever at substantially closed position thereof.

8. A variable speed transmission having first and second movable elements for effecting speed ratio changes through the transmission, a solenoid for controlling a movement of the second element, a relay for controlling the solenoid, said relay when deenergized likewise deenergizing the solenoid, a switch providing one path for energizing the relay, a second relay having contacts which when the second relay is deenergized provide a second path for energizing the solenoid relay, manual means for opening the switch to remove one path, a switch operated by a movement of the first element to condition the second relay for operation, and a switch, operated by the manual means prior to its opening the first path switch, for energizing the second relay to remove the second path, thereby deenergizing the relay and solenoid to effect a movement of the second element, said switch operated by the manual means for energizing the second relay being disconnected before the first mentioned switch is operated, and means for holding the second relay energized while the first mentioned switch is operated.

9. A variable speed transmission having first and second movable elements for effecting speed ratio changes through the transmission, a solenoid for controlling a movement of the second element, a relay for controlling the solenoid, said relay when deenergized likewise deenergizing the solenoid, a switch providing one path for energizing the relay, a second relay having contacts which when the second relay is deenergized provide a second path for energizing the solenoid relay, manual means for opening the switch to remove one path, a switch operated by a movement of the first element to condition the second relay for operation, a switch, operated by the manual means prior to its opening the first path switch, for energizing the second relay to remove the second path, thereby deenergizing the relay and solenoid to effect a movement of the second element, said switch operated by the manual means for energizing the second relay being disconnected before the first mentioned switch is operated, and means for holding the second relay energized while the first mentioned switch is operated, said means comprising an additional switch maintained in operation by the manual means throughout its range of movement from the second relay switch to the first mentioned switch, and a resistance, said additional switch and resistance being connected in parallel with the second relay switch, the resistance permitting enough energy to pass through to hold the second relay operated but insufficient energy to initiate the operation of said second relay.

10. A variable speed transmission having first and second movable elements for effecting speed ratio changes through the transmission, a solenoid for controlling a movement of the second element, a relay for controlling the solenoid, said relay when deenergized likewise deenergizing the solenoid, a switch providing one path for energizing the relay, a second relay having contacts which when the second relay is deenergized provide a second path for energizing the solenoid relay, manual means for opening the switch to remove one path, a switch operated by a movement of the first element to condition the second relay for operation, a switch, operated by the manual means prior to its opening the first path switch, for energizing the second relay to remove the second path, thereby deenergizing the relay and solenoid to effect a movement of the second element, and speed responsive means limiting the operation of the solenoid and relays to a predetermined range of operating speeds of the transmission.

11. A variable speed transmission having first and second movable elements for effecting speed ratio changes through the transmission, a solenoid for controlling a movement of the second element, a relay for controlling the solenoid, said relay when deenergized likewise deenergizing the solenoid, a switch providing one path for energizing the relay, a second relay having contacts which when the second relay is deenergized provide a second path for energizing the solenoid relay, manual means for opening the switch to remove one path, a switch operated by a movement of the first element to condition the second relay for operation, and a switch, operated by the manual means prior to its opening the first path switch, for energizing the second relay to remove the second path, thereby deenergizing the relay and solenoid to effect a movement of the second element, speed responsive means for rendering a movement of the first movable element impossible above a predetermined operating speed of the transmission, and means, operable when a movement of the first element is impossible, to overrule the switch operated by a movement of the first element and thereby render possible a movement by the second element.

12. A variable speed transmission having first and second movable elements for effecting speed ratio changes through the transmission, a solenoid for controlling a movement of the second element, a relay for controlling the solenoid, said relay when deenergized likewise deenergizing the solenoid, a switch providing one path for energizing the relay, a second relay having contacts which when the second relay is deenergized provide a second path for energizing the solenoid relay, manual means for opening the switch to remove one path, a switch operated by a movement of the first element to condition the second relay for operation, and a switch, operated by the manual means prior to its opening the first path switch, for energizing the second relay to remove the second path, thereby deenergizing the relay and solenoid to effect a movement of the second element, and speed responsive means for simultaneously rendering a movement of the first movable element impossible above a predetermined operating speed of the transmission and for overruling the switch operated by a movement of the first element and thereby render possible a movement of the second element.

13. A variable speed transmission having first and second movable elements for effecting speed ratio changes through the transmission, a solenoid for controlling a movement of the second element, a relay for controlling the solenoid, said relay when deenergized likewise deenergizing the solenoid, a switch providing one path for energizing the relay, a second relay having contacts which when the second relay is deenergized provide a second path for energizing the solenoid relay, manual means for opening the switch to remove one path, a switch operated by a movement of the first element to condition the second relay for operation, and a switch, operated by the manual means prior to its opening the first path switch, for energizing the second relay to remove the second path, thereby deenergizing the relay and solenoid to effect a movement of the second element, a single pole double throw switch, and speed responsive means for controlling the last mentioned switch such that said switch is in one of its positions below a predetermined speed and in the other of its positions at or above said predetermined speed, said switch when in its other position being in parallel with the switch operated by a movement of the first element and similarly effective upon the second relay.

14. A variable speed transmission device comprising a pair of movable elements for controlling the speed ratio through the transmission, individual electromagnetic means for controlling the elements, said electromagnetic means including a source of electrical energy and connections between the electromagnetic means and the energy source, an ignition circuit, a relay for controlling the effectiveness of the ignition circuit, a manually controlled switch for conditioning the relay for operation, a pair of switches in series with the manually controlled switch and in parallel with one another for controlling the operation of the relay, one switch being controlled in part by movement of one of the movable elements, and the other being controlled by movement of the other movable element.

15. A variable speed transmission as described in claim 14, a relay controlling the circuit through the said one switch, and an additional switch controlled by movement of the other movable element for controlling the last mentioned relay.

16. A variable speed transmission as described in claim 14, a relay controlling the circuit through the said one switch, an additional switch controlled by movement of the other movable element for controlling the last mentioned relay, and speed controlled switch means simultaneously rendering the electromagnetic means for the other movable element inoperative to effect a movement and overruling the additional switch to render the operation of the last mentioned relay independent thereof.

17. A transmission comprising input and output shafts, a plurality of gear trains connectible between the shafts to provide a plurality of forward speed ratios, means controlled jointly by the speed of a member associated with the transmission and by the operator for effecting downshifts between the speeds, said means, within a predetermined range of speed of the speed controlled member, making possible a double downshift by successive movements of the operator, and differentiating means for preventing the second one of said downshifts after the first one of the downshifts except by a movement of the operator substantially identical with the movement of the operator for the first downshift.

18. A transmission comprising input and output shafts, a plurality of gear trains connectible between the shafts to provide a plurality of forward speed ratios, means controlled jointly by the speed of a member associated with the transmission and by the operator for effecting downshifts between the speeds, said means, within a predetermined range of speeds of the speed controlled member, making possible a double downshift by successive substantially identical movements of the operator, and differentiating means for enabling the operator to select one of the shifts included in the double downshift, said last-mentioned means including a manually operable lever and a switch having a plurality of contacts which are controlled by the position of the lever.

19. A transmission comprising input and output shafts, a plurality of gear trains connectible between the shafts to provide a plurality of forward speed ratios, means controlled jointly by the speed of a member associated with the transmission and by the operator for effecting downshifts between the speeds, said means, within a predetermined range of speeds of the speed controlled member, making possible a double downshift by successive substantially identical movements of the operator, and differentiating means for enabling the operator to select one of the shifts included in the double downshift, said last-mentioned means including an accelerator pedal, and a multiple contact switch operated in unison with the pedal, one set of contacts being operated at substantially the limit of movement of the pedal in one direction, and another set of contacts being operated at substantially the mid-position of the pedal.

20. A variable transmission including positively interengageable elements for effecting a change in the transmission, power means for urging one of the elements toward engagement with the other element, automatic speed controlled means for conditioning the power means for operation, manual means for energizing the power means on an operative stroke of the manual means when said speed controlled means is operative, and means for introducing a delay in the energization of the power means for a predetermined time after the operative stroke of the manual means to permit the elements to approach synchronism before engaging.

21. A variable transmission including positively interengageable elements for effecting a change in the transmission, power means for urging one of the elements toward engagement with the other element, automatic speed controlled means for conditioning the power means for operation, manual means for initiating the energization of the power means, means for introducing a delay in the full energization of the power means to permit the elements to approach synchronism before engaging, said manual means comprising a power control lever, and a switch which is inoperative to effect a change in the power means until the lever is in power cut off position.

22. A variable transmission including positively interengageable elements for effecting a change in the transmission, power means for urging one of the elements toward engagement with the other elements, automatic speed controlled means for conditioning the power means for operation, manual means for initiating the energization of the power means, and means for introducing a delay in the full energization of the power means to permit the elements to approach synchronism before engaging, said positively interengageable elements comprising a rotatable slotted element and a rotationally fixed radially slidable pawl adapted to engage one of the slots to arrest the rotation of the slotted element, and said manual means comprising an accelerator pedal and a switch which is inoperative to effect a change in the power means until the accelerator is in substantially closed position.

23. A variable transmission including positively interengageable elements for effecting a change in the transmission, electrical power means for urging one of the elements toward engagement with the other element, automatic speed controlled means for conditioning the power means for operation, manual means for initiating the energization of the power means, and means for introducing a delay in the full energization of the power means to permit the elements to approach synchronism before engaging, said delay means comprising a slow operating relay having a predetermined time lag.

24. A transmission comprising input and output shafts, an intermediate shaft, a plurality of power trains including a second speed gear train connectible between the input shaft and the intermediate shaft, said second speed gear train including an overrunning clutch transmitting power to drive said intermediate shaft from said input shaft, a lockup clutch for the overrunning clutch, an overrunning clutch operative between said intermediate and output shafts for transmitting power from the intermediate shaft to the output shaft, a lockup clutch for said last named overrunning clutch, an overdrive mechanism selectively connectible between said intermediate and output shafts, automatically controlled means for establishing said various power trains and overdrive mechanism, means for operating the second speed lockup and overdrive lockup clutches jointly, and means controlled by the lockup operating means for rendering the automatically controlled means inoperative.

25. A transmission comprising input and output shafts, an intermediate shaft, means for driving said intermediate shaft from said input shaft and including an overrunning clutch through which power for driving the intermediate shaft is transmitted, means for driving said output shaft from said intermediate shaft and including an overrunning clutch through which power for driving the output shaft is transmitted, said clutches being adapted to complete a drive to said output shaft from said input shaft, individual means for locking up the overrunning clutches, and a control which when given an operative stroke is effective to operate both of said lockup means simultaneously.

References Cited in the file of this patent

UNITED STATES PATENTS

| | | |
|---|---|---|
| 2,045,500 | Thurber | June 23, 1936 |
| 2,054,222 | Lapsley | Sept. 15, 1936 |
| 2,169,216 | Bloxsom | Aug. 15, 1939 |
| 2,203,177 | Patterson | June 4, 1940 |
| 2,229,337 | Neracher et al. | Jan. 21, 1941 |
| 2,236,657 | Webb | Apr. 1, 1941 |
| 2,241,632 | Claytor | May 13, 1941 |
| 2,248,133 | Snow | July 8, 1941 |
| 2,251,213 | Lanphere | July 29, 1941 |
| 2,259,732 | Burtnett | Oct. 21, 1941 |
| 2,259,733 | Burtnett | Oct. 21, 1941 |
| 2,264,010 | Syrovy | Nov. 25, 1941 |
| 2,266,598 | Hale | Dec. 16, 1941 |
| 2,267,603 | Claytor | Dec. 23, 1941 |
| 2,279,999 | McKechnie | Apr. 14, 1942 |